United States Patent
Ford et al.

(10) Patent No.: US 6,823,190 B2
(45) Date of Patent: Nov. 23, 2004

(54) SYSTEM AND METHOD TO ANONYMOUSLY TEST FOR PROXIMITY OF MOBILE USERS WITHOUT REVEALING INDIVIDUAL PHASE SPACE COORDINATES

(75) Inventors: Daniel Alexander Ford, Los Gatos, CA (US); James Harvey Kaufman, San Jose, CA (US); Jussi Petri Myllymaki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 10/065,949

(22) Filed: Dec. 3, 2002

(65) Prior Publication Data

US 2004/0198373 A1 Oct. 7, 2004

(51) Int. Cl.[7] .................................................. H04Q 7/20
(52) U.S. Cl. .............................. 455/456.3; 455/456.1; 455/456.2; 455/414.3; 342/458
(58) Field of Search ........................... 455/456.1, 456.2, 455/456.3, 414.2, 414.3; 342/450, 451, 458

(56) References Cited

U.S. PATENT DOCUMENTS

| | | | | |
|---|---|---|---|---|
| 5,689,809 | A | 11/1997 | Grube et al. ................. | 455/54.1 |
| 6,738,808 | B1 * | 5/2004 | Zellner et al. ............... | 709/223 |
| 2002/0080968 | A1 * | 6/2002 | Olsson ........................ | 380/270 |
| 2002/0156646 | A1 * | 10/2002 | Kaiwa et al. ................. | 705/1 |
| 2002/0168958 | A1 * | 11/2002 | Ford et al. ................... | 455/404 |
| 2003/0020623 | A1 * | 1/2003 | Cao et al. .................. | 340/686.6 |
| 2003/0023726 | A1 * | 1/2003 | Rice et al. ................... | 709/225 |
| 2003/0130893 | A1 * | 7/2003 | Farmer ........................ | 705/14 |
| 2003/0188171 | A1 * | 10/2003 | DeCenzo et al. ............ | 713/185 |
| 2004/0107144 | A1 * | 6/2004 | Short ........................... | 705/26 |

FOREIGN PATENT DOCUMENTS

| | | | |
|---|---|---|---|
| DE | 10022692 | 11/2001 | ............ H04Q/7/12 |
| DE | 10061993 | 7/2002 | ............ H04Q/7/38 |
| WO | WO 98/48969 | 11/1998 | |
| WO | WO 00/22860 | 4/2000 | ............ H04Q/7/38 |
| WO | WO 00/65761 A2 | 11/2000 | |
| WO | WO 00/79811 A1 | 12/2000 | ............ H04W/7/22 |
| WO | WO 01/28273 A1 | 4/2001 | ............ H04Q/7/38 |
| WO | WO 01/65339 A2 | 9/2001 | |
| WO | WO 01/84867 | 11/2001 | ............ H04Q/7/22 |

OTHER PUBLICATIONS

Herzberg et al., "On Travelling Incognito," *Proceedings of the Workshop on Mobile Computing Systems and Applications, 1994, IEEE*, Dec. 8–9, 1994, pp. 205–211.

* cited by examiner

*Primary Examiner*—Edward F. Urban
*Assistant Examiner*—Duy K Le
(74) *Attorney, Agent, or Firm*—Lacasse & Associates, LLC; Randy W. Lacasse; Ramraj Soundararajan

(57) ABSTRACT

Described is a way for computing proximity (location-based proximity or preference-based proximity) between mobile wireless subscribers (who use different services) without either divulging their location/preference to the other (preservation of privacy). Privacy is kept by providing location/preference information in steps, along with an evaluation function. The services receive partial results and then locally compute the final result, or proximity. The term proximity includes not just physical proximity but also multi-dimensional data such as preference profiles and vectors (e.g., an affinity for baseball, apple pie, and ballroom dancing).

20 Claims, 10 Drawing Sheets

SYSTEM AND METHOD TO ANONYMOUSLY TEST FOR PROXIMITY OF MOBILE USERS WITHOUT REVEALING INDIVIDUAL PHASE SPACE COORDINATES

BACKGROUND OF THE INVENTION

1. Field of Invention

The present invention relates generally to the field of mobile communication devices. More specifically, the present invention is related to anonymously testing proximity between mobile users without revealing individual phase space coordinates.

2. Discussion of Prior Art

Application Service Providers (ASP's) are increasingly offering a myriad of services over various networks. Many of these services make use of a user's location data to provide targeted user-specific information.

A specific implementation of such a service is a location-based service that requires detecting and reporting the relative proximity of two or more users. There exists a multitude of Wireless Service Providers (WSPs) that are able to deliver Location Tracking Services (LTSs) (or they may allow users to subscribe to a multitude of such LTSs). Since individuals may wish or need to be aware of their proximity to users subscribing to different service providers, information must be exchanged between the different service providers to detect proximity. Exchanging an individual's location data is undesirable, as it exposes the user to potential threats with regard to his/her privacy. By the same token, not exchanging the data severely diminishes the utility of such location-based services.

A brief description of prior art in the area of location-based services is provided below, but it should be noted that the prior art fail to provide for a system or method to anonymously test for the proximity of users without exchanging their location coordinates.

A prior art solution concerning the exchange of a user's location data involves encrypting the location data and sharing such encrypted data between the wireless service providers. This solution, however, has some major disadvantages, some of which are outlined below:

1) Management of the public key encryption is complex—especially given the rate of queries and proximity calculations required. An individual wireless provider may have millions of clients, and each of these clients may wish to be alerted to the proximity of users of dozens of other wireless services.

2) Assuming the wireless providers exchange the information protected by encryptions, at some point the other service providers will be in possession of the location data for non-subscribing users. This requires that users trust every wireless provider (whether they are subscribers or not) to control access to this data. The system and method of the present invention eliminates this problem by avoiding the sharing of sensitive data.

The published patent application to Doi et al. (US 2001/0014911 A1) provides for a method and system for providing services wherein a trusted service provider provides service information dependent on location information of a mobile terminal to the mobile terminal in response to a service request with the location information sent by the mobile terminal. Doi et al., however, fail to address privacy concerns in the communication between multiple instances of such services.

The published patent application to Kinnunen et al. (US 2001/0018349 A1) provides for location-dependent services. Disclosed is a location-based system (LBS) for providing location-dependent services to a plurality of mobile terminals within a coverage area.

The published patent application to Watson (US 2002/0026517 A1) enables communications of electronic data between an information requestor and a geographically proximate service provider. Disclosed is a method for transferring electronic data comprising: receiving a request to access a communications system at a first geographical location from a client located at a second geographical remote from the first geographical location; identifying a proxy local to the client in the second geographical location; and receiving subsequent data requests from the client at the proxy. Watson, however, fails to disclose a third-party anonymous function evaluation service. Additionally, Watson requires trust and knowledge between the service providers.

The PCT publication to Huber et al. (WO 0079811 A2) provides for a method and system for offering mobile subscribers anonymous, location-based services. Disclosed is a method wherein a user, who has his/her own trusted service provider, picks one or more services he/she is interested in and sends his/her location to the trusted service provider, whereupon the service provider gets the location of the service and performs a range query. Thus, the service provider researches locations for services (for example, the yellow pages). The PCT publication to Lammi et al. (WO 0128273 A1) provides for a similar recitation.

The published patent application to Hunzinger (US 2002/001173 A1) provides for communication of location information in a wireless communication system. Disclosed is a mobile station, such as a cellular or PCS phone, in a wireless communication system which transmits position information to the system server. The mobile station may communicate position location and movement tracking information between the mobile station and the wireless communication infrastructure.

The U.S. patent to Drane et al. (U.S. Pat. No. 6,275,705) provides for a location tracking system. The method allows for finding the position of a mobile radio-frequency transceiver in a communications system. Determination includes the means to use the known distances and measured times to determine the relative time offsets of transmissions from each base station and location means to use the determined relative time offsets and to calculate the position of a mobile transceiver in the network area using hyperbolic positioning techniques.

The PCT publication to Natarajan et al. (WO 01/65339) provides for an architecture for providing information to devices wherein the architecture comprises a data collector, an information server, an evaluation mechanism, and an action handler. The evaluation mechanism determines if a change occurs in an evaluation of an expression and generates a notification.

The non-patent literature to Herzberg et al. entitled "On Traveling Incognito" discusses solutions to anonymity in mobile environments. A "frequently changing" aliasing is provided as part of the solution.

Whatever the precise merits, features, and advantages of the above-cited prior art, none of them achieves or fulfills the purposes of the present invention.

SUMMARY OF THE INVENTION

The present invention provides for a system and a method for anonymizing data associated with mobile telephone users in a phase space, wherein such data is used in the calculating proximity between the users without divulging their location or preference vectors in the phase space. The privacy is kept by providing location coordinate information or preference vector coordinate information in steps, along with an evaluation function. The services receive the partial results and then locally compute the final result, giving a proximity estimate. It should be noted that the term proximity includes not just proximity in terms of Euclidean distance but includes proximity in a phase space made of preference profiles and vectors (e.g., affinity for baseball, apple pie, ballroom dancing, etc.).

In a specific embodiment, the present invention's method assists a first and second location tracking service (LTS) in anonymizing location data associated with a first and second user in a phase space, wherein the first and second user are tracked by the first and second LTS respectively. The location data is defined by one or more parameters. The method, as implemented in an anonymous function evaluation service (AFES), comprises the following steps: (1) receiving a request for function evaluation from each LTS, wherein the request identifies a parameter to be transmitted and a corresponding function to be used for evaluating said identified parameter; (2) transmitting a confirmation to each LTS indicating the AFES is awaiting reception of the identified parameter; (3) receiving the identified parameter from each LTS; (4) evaluating the corresponding function based on the received parameter from each LTS; and (5) transmitting the evaluated result to each LTS. Steps a–e are repeated for each additional parameter required to define location data and corresponding function such that each of said LTS's receives function evaluated results from said AFES for each parameter separately and utilizes such evaluated results to locally estimate proximity between said first and second user in said phase space without revealing their location data.

The anonymous function evaluation service (AFES) of the present invention comprises: (1) an interface to communicate with various location tracking services (LTSs) or wireless service providers (WSPs) and receive parameters and corresponding functions; (2) a task list storing the functions to be evaluated on received data; (3) a data cache storing the received parameters to be processed; (4) a function evaluation engine evaluating mathematical function(s) on parameters; and (5) a task manager operatively linked with the task list, data cache, and function evaluation engine, said task manager: receiving parameters and corresponding functions from the interface; sending the functions and parameters to task list and data cache respectively; retrieving said functions from data cache; and communicating with function evaluation engine and sending results of the function evaluation engine back to the interface for forwarding values to requesting services.

DESCRIPTION OF THE PREFERRED EMBODIMENTS

Figure 1:
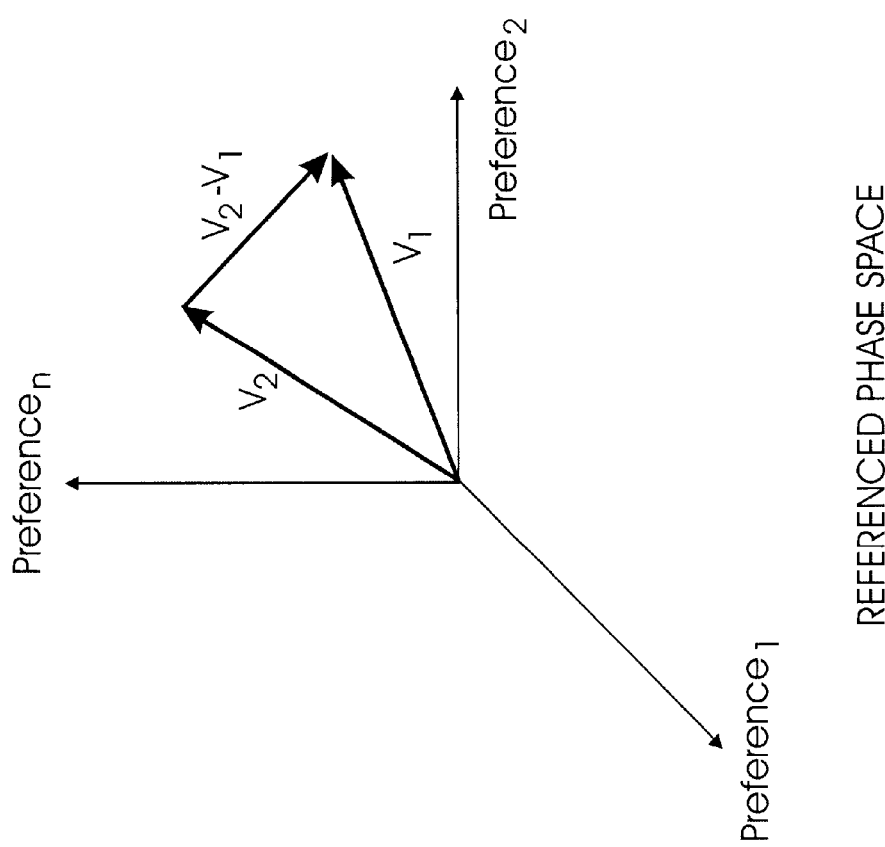
FIG. 1 illustrates a scenario wherein a set of preferences associated with an individual is represented using a vector V={pref_1, pref_2, . . . , pref_n}.

While this invention is illustrated and described in a preferred embodiment, the invention may be produced in many different configurations. There is depicted in the drawings, and will herein be described in detail, a preferred embodiment of the invention, with the understanding that the present disclosure is to be considered an exemplification of the principles of the invention and the associated functional specifications for its construction and is not intended to limit the invention to the embodiment illustrated. Those skilled in the art will envision many other possible variations within the scope of the present invention.

It should be noted that the term "distance" as used throughout the specification includes not just physical proximity, but also includes multi-dimensional data such as preference profiles and vectors (e.g., an affinity for baseball, apple pie, ball room dancing, etc.). Hence, the literal interpretation of the term "distance" should not be used to limit the scope of the present invention.

The present invention provides for a system and method to estimate proximity in an arbitrary phase space without exchanging specific preference data. A generalized example would include proximity estimation in a phase space defined by n dimensional preference vectors. FIG. 1 illustrates such a scenario, wherein a person's preferences can be represented using orthogonal personal preference components. A set of preferences associated with an individual is represented using a vector V={pref_1, pref_2, . . . , pref_n}, wherein pref_i is a scalar measure of a person's like or dislike for some specific property. One can measure the difference between the profile vectors of two people in exactly the same way one measures the distance in space by sending the orthogonal scalar measures one property at a time. Proximity between two individuals in this phase space is the difference between the preference vectors associated with each of the individuals. For example, if user A has a preference vector of $V_1$={pref_1, pref_2, . . . , pref_n}, and user B has a preference vector $V_2$={$pref_{13}$ 1',pref_2', . . . , pref_n'}, then the proximity is given by $|V_2-V_1|$.

Figure 2:
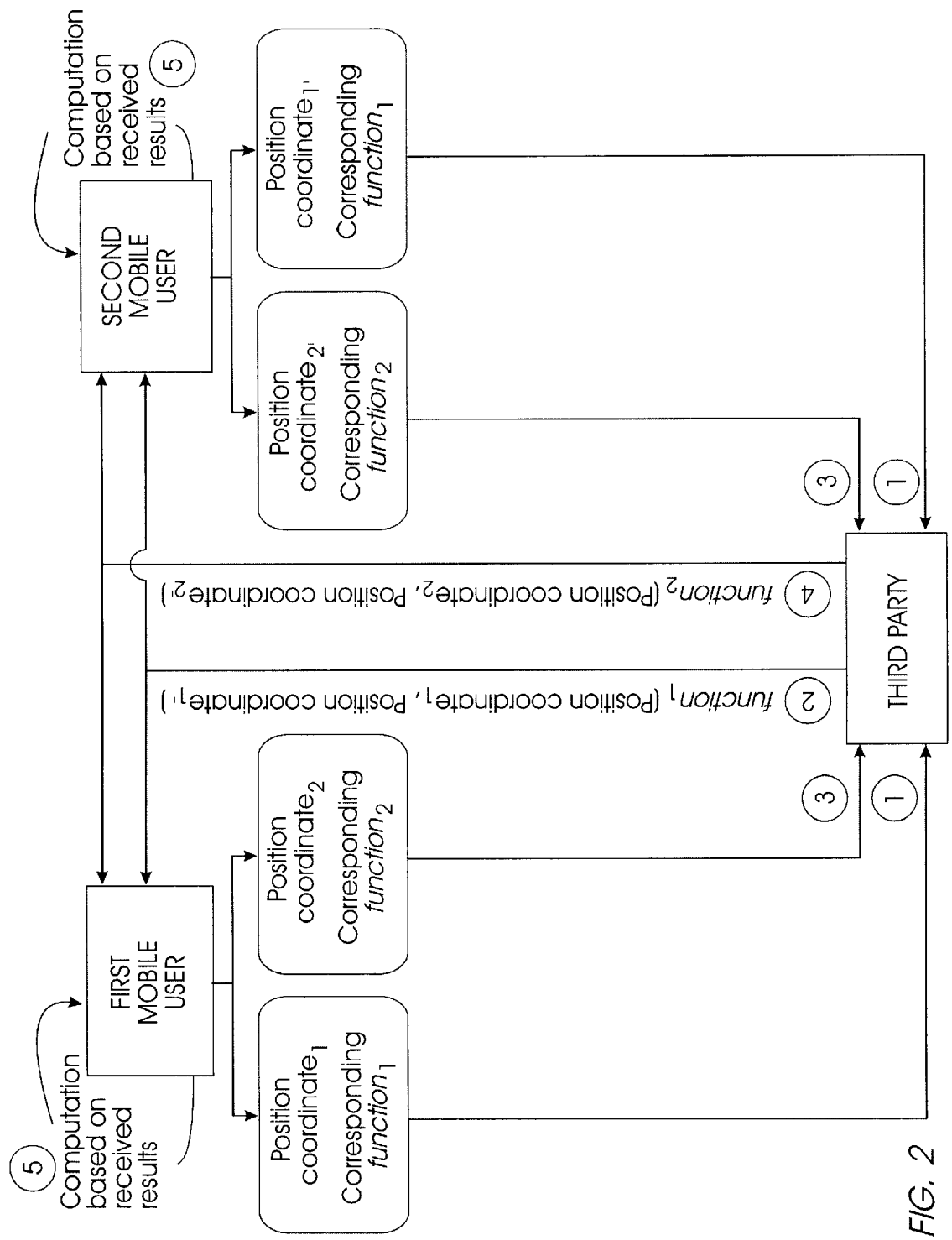
FIG. 2 illustrates an exemplary embodiment of the present invention's method for estimating proximity between two mobile users.

FIG. 2 illustrates an exemplary embodiment of the present invention's method for estimating proximity between two mobile users. In the method in FIG. 2, coordinates in a particular phase space and associated functions are sent individually to a third party. The third party calculates a parameter for each of the received functions and coordinates and separately forwards each of the estimated parameters to each of the users. Based upon the received parameters, users are able to perform various computations locally to estimate proximity to other users. For example, a local computation for distance between two users in a particular multidimensional phase space can be made wherein the phase space is defined by specific preference profiles and vectors (e.g., an affinity for baseball, apple pie, and ballroom dancing).

Figure 3:
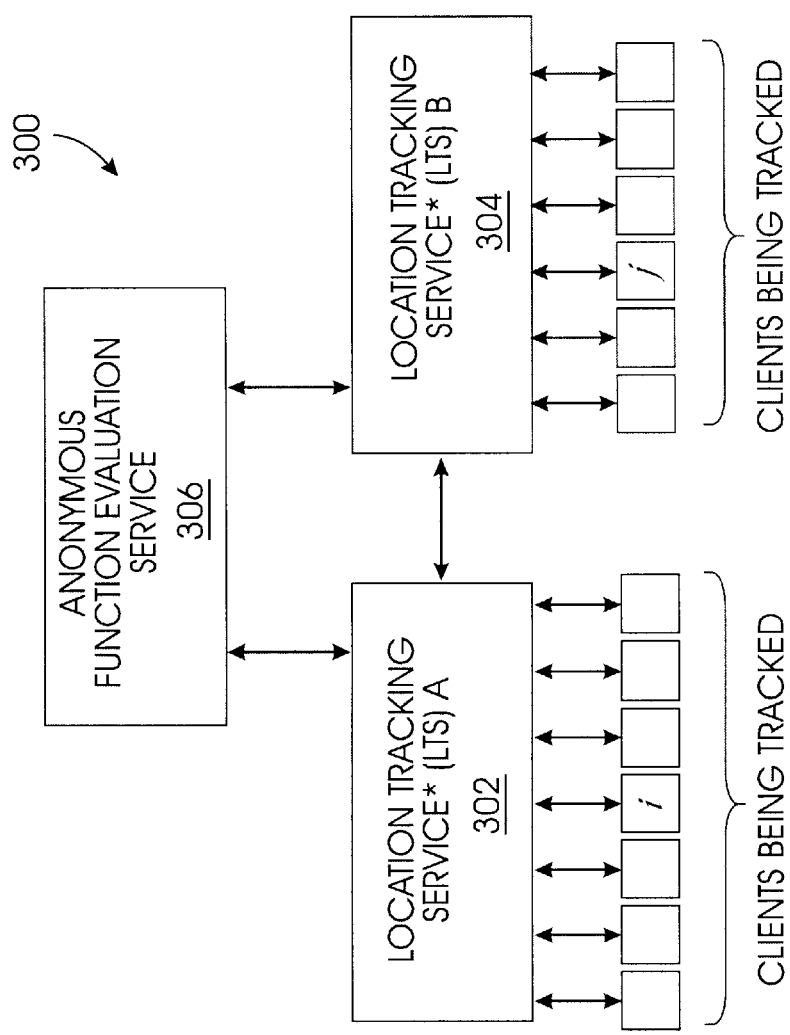
FIG. 3 illustrates a specific example of the present invention's architecture for anonymizing location data.
Figure 4:
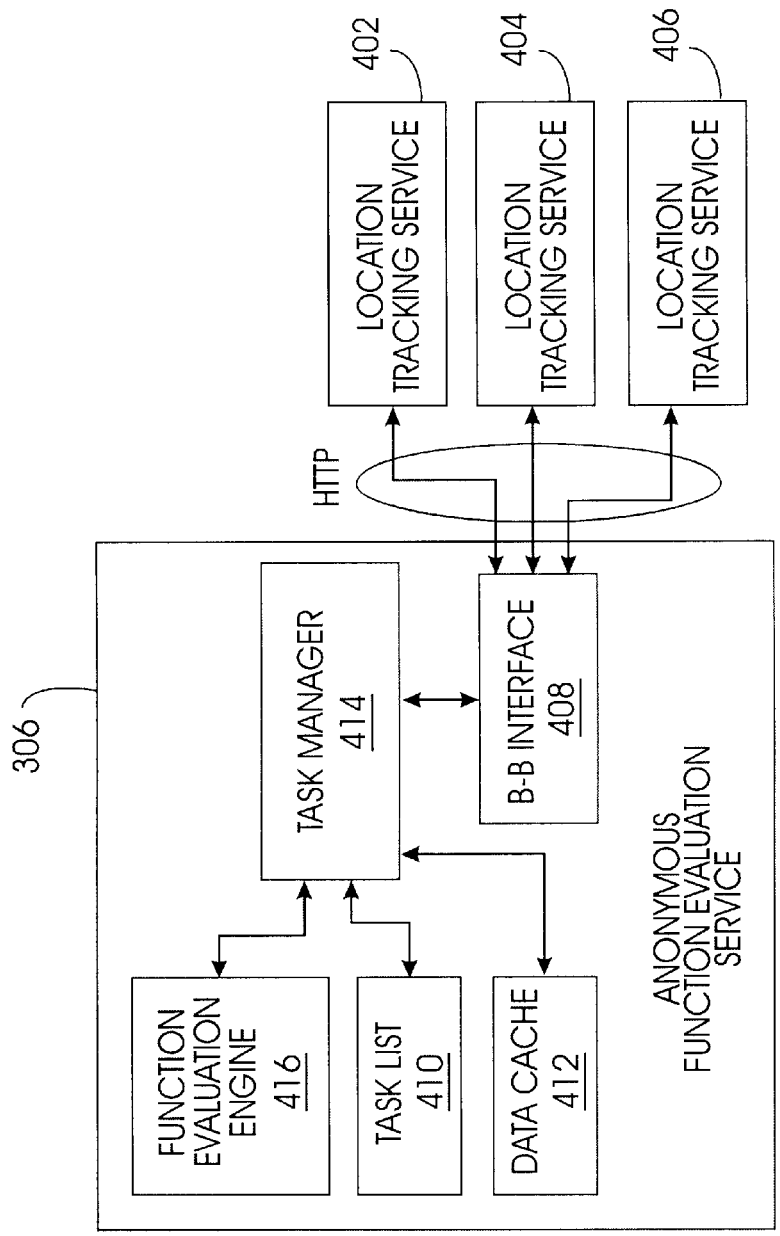
FIG. 4 provides a detailed architecture of the anonymous function evaluation service (AFES) of FIG. 3.

FIG. 3 illustrates a specific example of the present invention's architecture 300 for anonymizing location data. Architecture 300 comprises: location tracking service A 302, location tracking service B 304, and anonymous function evaluation service (AFES) 306. Both location tracking service A 302 and B 304 are able to track one or more clients, wherein the location tracking service (LTS) could be provided by a wireless service providers (WSP) or by an independent service provider. A description of each of the components of architecture 300 is provided below:

1. AFES 306: The present invention's third-party Anonymous Function Evaluation Service (AFES) receives collections of anonymized floating point values; and by design, it is never able to determine the location of any user of any service. Therefore, the AFES cannot be corrupted or otherwise compromise the privacy of users of any wireless service. The AFES simply receives numerical data from the individual wireless services and performs function evaluation on that data based on the instructions of the respective wireless services. It responds to the (registered) requesting services with the results of these calculations on the data they submitted (in coordination with other LTSs). Hence, the AFES never knows the location of any user. The wireless services are aware of their own user's locations and can deduce the proximity of their users to subscribers of other wireless service providers, but need never share their user locations with other service providers. FIG. 4 provides a detailed architecture of the AFES 306 of FIG. 3. AFES interacts with a multitude of WSPs or LTSs (402, 404, 406) over a protocol such as hypertext transfer protocol (HTTP). AFES 306 receives numerical data and instructions for function evaluation and returns the results of function evaluations. Subcomponents of the AFES 306 include:

a. B—B interface 408: This subcomponent handles communication (via protocols such as HTTP) with various LTSs or other WSPs. B—B interface 408 receives collections, enumerations, or vectors of floating point values. B—B interface 408 also receives collections of identifying keys for enumerated values and functions to allow collections from separated tracking services to be evaluated together.

b. Task List 410: Subcomponent 410 stores a list of tasks and functions to be evaluated on data.

c. Data Cache 412: Subcomponent 412 stores collections or enumerations of data (floating point numbers) to be processed.

d. Task Manager 414: Subcomponent 414 manages the AFES architecture 306. Such management includes: (1) receiving enumerations from B—B interface 408; (2) sending enumerated values to task list 410 and data cache 412; (3) retrieving data and evaluation functions from data cache 412; (4) handling communications with function evaluation engine 416; (5) performing validity checks on data, evaluation functions, and identifying keys; (6) catching errors; and (7) sending results of function evaluation engine 416 back to B—B interface 408 for forwarding values to requesting services.

e. Function Evaluation Engine 416: Subcomponent 416 evaluates mathematical function(s) on floating point or other data (individually or as a collection, enumeration, or vector).

Figure 5:
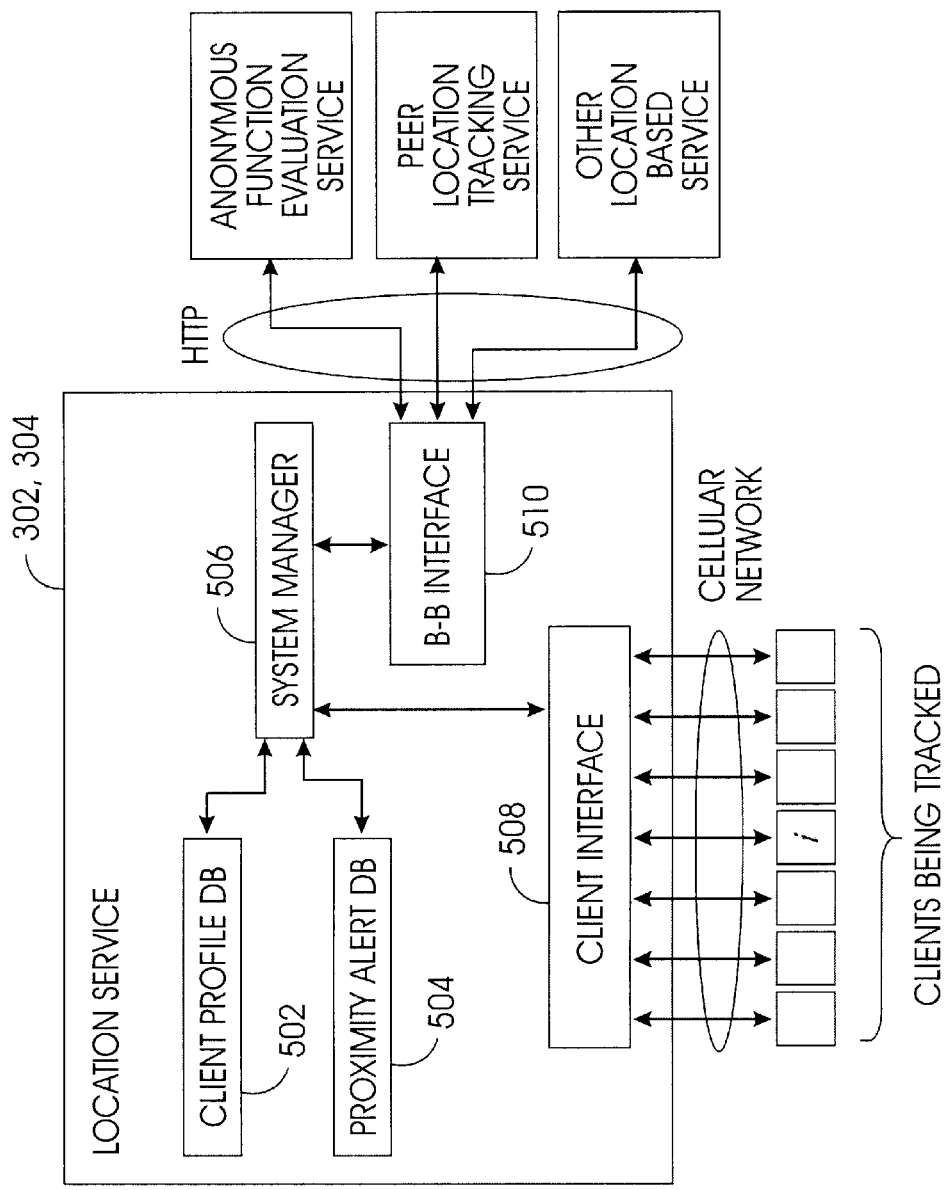
FIG. 5 illustrates subcomponents associated with the location tracking service (LTS).

2. Location Tracking Service (LTS) 302 and 304: A wireless service provider in communication with a multitude of clients through cellular or other wireless network (s). FIG. 5 illustrates subcomponents associated with the LTS 302 and 304. A brief description of these subcomponents are provided below:

a. Client Profile Database 502: Subcomponent 502 contains client ID's, billing information, location service profile (what services the client uses), etc.

b. Proximity Alert Database 504: Each client ID specifies what other clients (or groups or events) they wish to receive alerts about. Each alert entry specifies (if necessary) the URL or ID of foreign location service providers (if not part of the current LTS system).

c. System Manager 506: Controls access to the client profile and proximity databases in response to requests from the B—B interface 510. System manager 506 manages client data through the client interface 508.

d. Client Interface 508: Subcomponent 508 communicates with client devices over a network such as a cellular network. Client interface 508 receives location data from client devices and sends that data to the system manager 506.

e. B—B interface 510: Subcomponent 510 comprises a firewall for monitoring activity over the World Wide Web (WWW). The B—B interface 510 passes requests from other LTS providers to the system manager 506 and sends requests to other LTS providers. Additionally, subcomponent 510 handles communications with the AFES service(s).

3. Wireless Service Provider.

4. Client: User of a client device.

5. Client device: Wireless devices with native tracking (e.g., GPS).

Alternatively, the device may be tracked by an LTS provider by the communication or cellular hub the device is in communication with.

Figure 6:
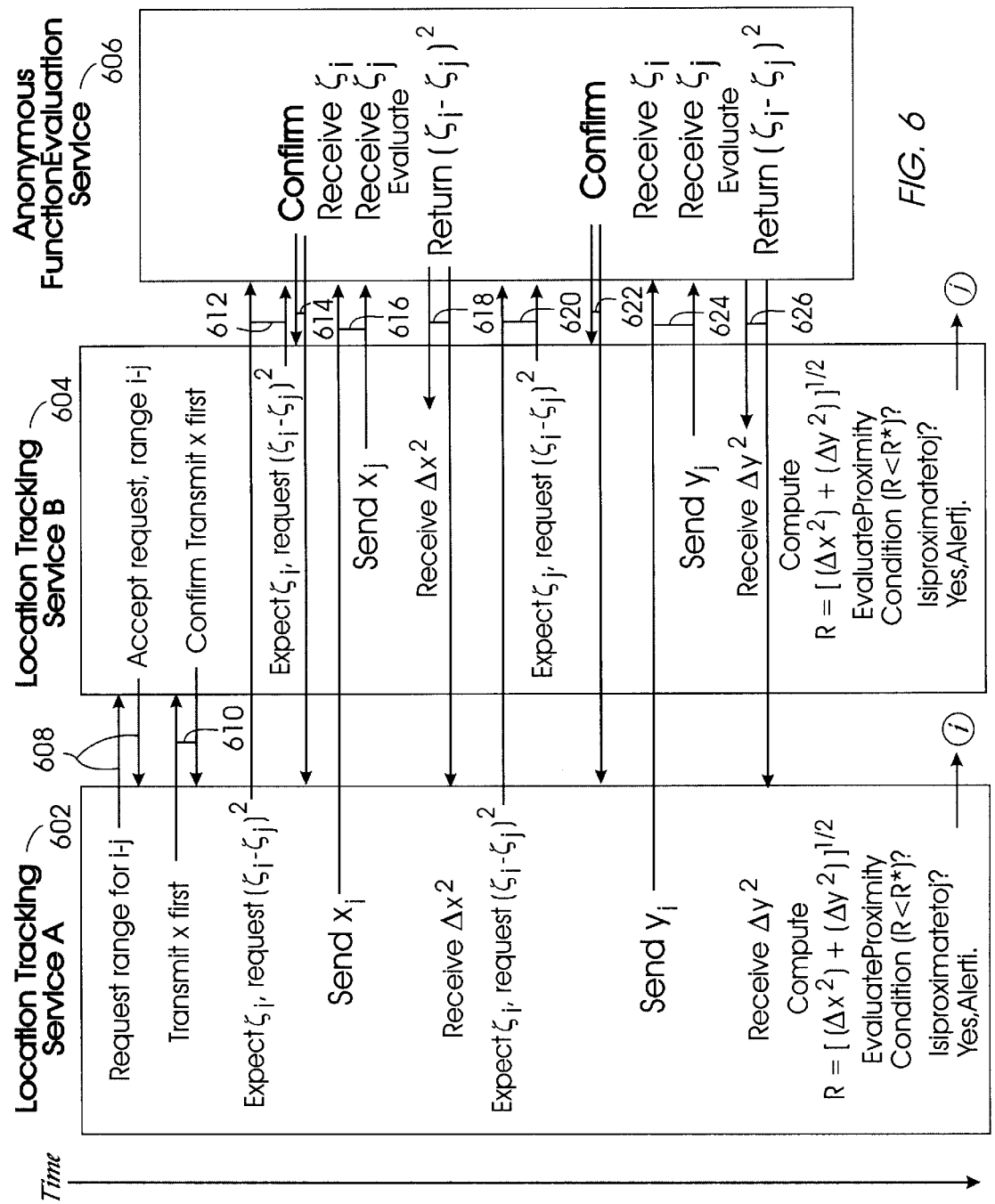
FIG. 6 illustrates a time-line diagram representative of a specific example outlining the various interactions of the components (location tracking service A, location service tracking B, and the anonymous function evaluation service) of the present invention's architecture shown in FIG. 3.

FIG. 6 illustrates a time-line diagram representative of a specific example outlining the various interactions of the components (location tracking service A, location service tracking B, and the anonymous function evaluation service) of the present invention's architecture shown in FIG. 3. It should be understood that the example is provided merely for the purposes of outlining the functionality associated with the components of the architecture of FIG. 3. Hence, the implementation of the present invention should not be restricted to just examples mentioned in the specification.

The example outlined in FIG. 6 is directed to alerting a user, i, if another user, j, is in a proximate region. The steps shown in the time-line diagram are given below:

Step 608: A request for the range between users i and j is exchanged between location tracking service A 602 and location service B 604.

Step 610: In this step, a confirmation is exchanged between location tracking services A 602 and B 604 regarding which parameter is to be first transmitted to AFES. In the specific example shown, the transmission of the x coordinate (as the first coordinate to be transmitted) is confirmed as the parameter to be transmitted first.

Step 612: In this step, an identification is made (by location tracking service A 602 and B 604) with regard to what common function(s) is to be used for evaluation by AFES 606. In the specific example, AFES 606 is told to expect parameter $\zeta_i$ and is expected to return the evaluated function $(\zeta_i - \zeta_j)^2$ back to location tracking service A 602 and B 604.

Step 614: A confirmation is sent from AFES 606 to each of the location tracking services A 602 and B 604 regarding the agreed upon function.

Step 616: In this step, as decided upon in step 610, a first parameter is sent from location tracking service A 602 to AFES 606. In the specific example, parameter $x_i$ is sent from location tracking service A 602 to AFES 606 and, similarly, parameter $x_i$ is sent from location tracking service B 604 to AFES 606.

Step 618: In this step, based upon the agreed upon function, a new parameter is calculated based upon the function and forwarded to location tracking services A 602 and B 604. In the specific example, the agreed upon function is $(\zeta_i-\zeta_j)^2$, and the result $\Delta x^2=(x_i-x_j)^2$ is transmitted to location tracking services A 602 and B 604.

Step 620: In this step, similar to step 612, an identification is made (by location tracking service A 602 and B 604) with regard to what common function(s) is to be used for evaluation by AFES 606 for the next parameter to be passed. In the specific example, AFES 606 is told to expect another input parameter $\zeta_i$ and, in turn, is expected to return the evaluated function $(\zeta_i-\zeta_j)^2$ back to location tracking service A 602 and B 604.

Step 622: This step is similar to the confirmation step 614.

Step 624: This step is similar to step 616, wherein a new parameters $y_i$ and $y_j$ are sent to the AFES 606 by location tracking services A 602 and B 604, respectively.

Step 626: In this step, based upon the agreed upon function, a new parameter is calculated based upon the function and forwarded to location tracking services A 602 and B 604. In the specific example, the agreed upon function is $(\zeta_i-\zeta_j)^2$ and the result a $\Delta y^2=(y_i-y_j)^2$ is transmitted to location tracking services A 602 and B 604.

Lastly, a computation is made locally for calculating the distance based upon the received values $\Delta x^2$ and $\Delta y^2$. Thus, distance R is calculated using $[(\Delta x^2)+(\Delta y^2)]^{1/2}$. After R is computed, an evaluation condition is assessed. For example, as an estimate of proximity, computed R can be compared to a threshold R*(i.e., is R<R*?). If the evaluation condition is met (if it is true that R<R*), an alert is issued.

Figure 7:
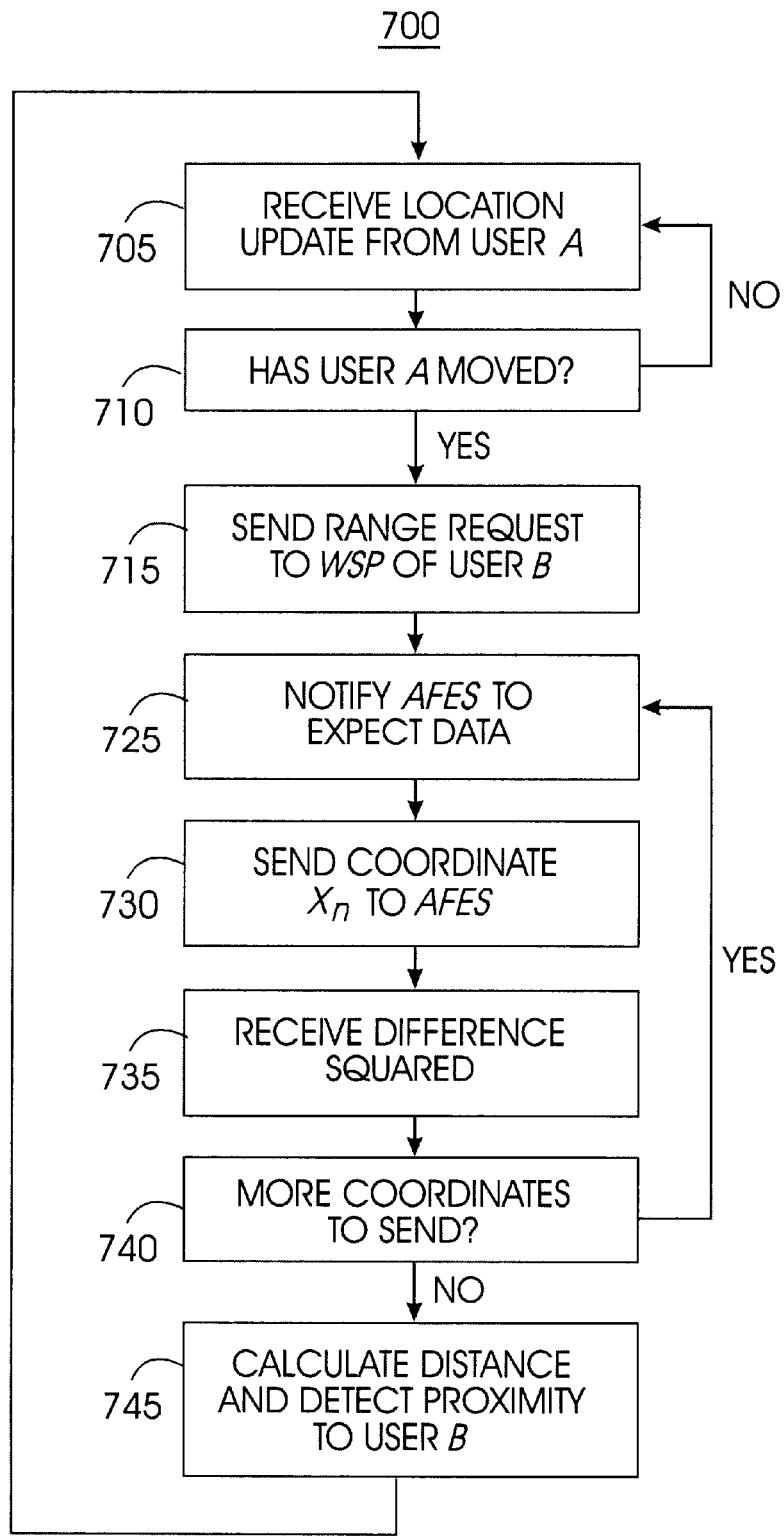
FIG. 7 illustrates a flowchart outlining the process associated with the location receiver.
Figure 8:
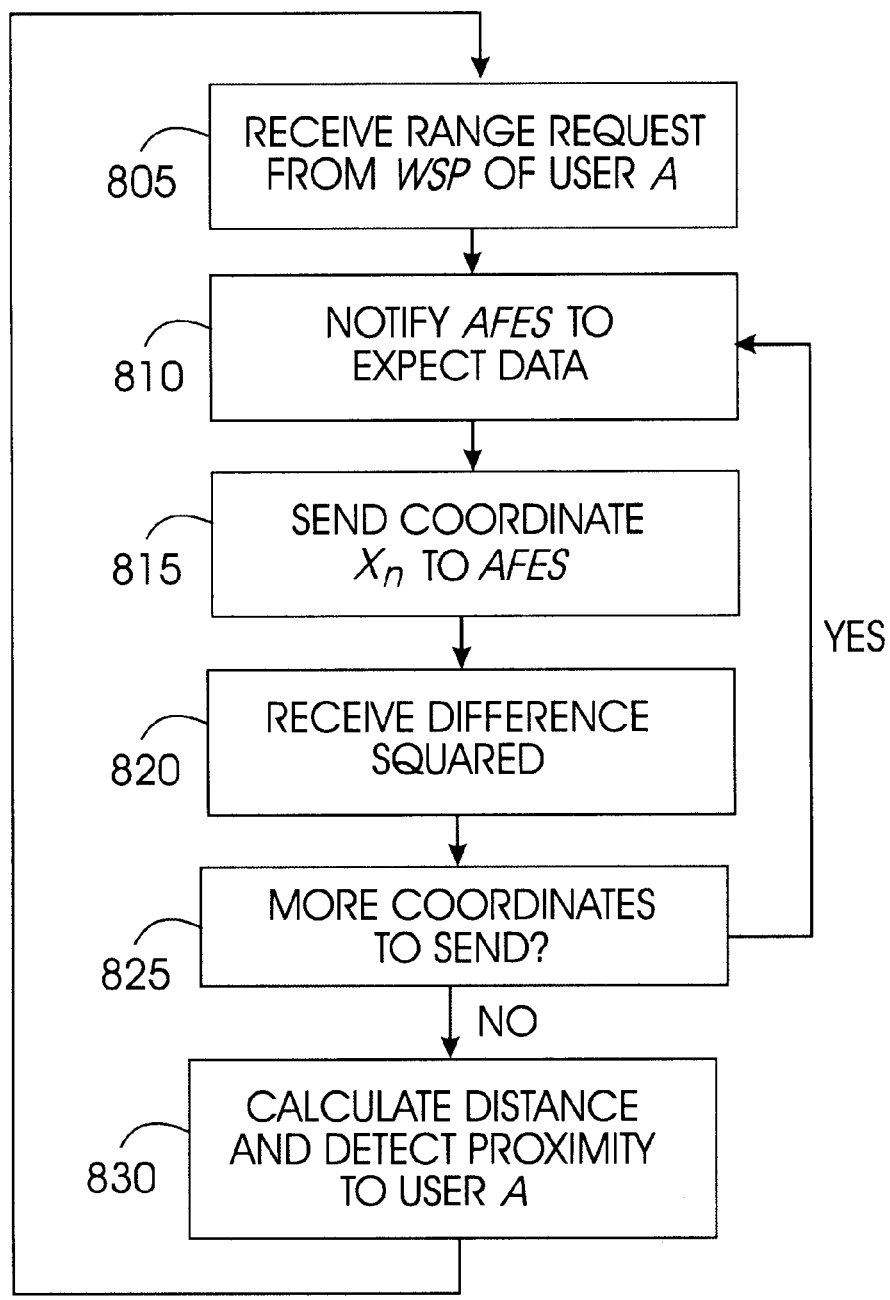
FIG. 8 illustrates a flow diagram of the request handler process.
Figure 9:
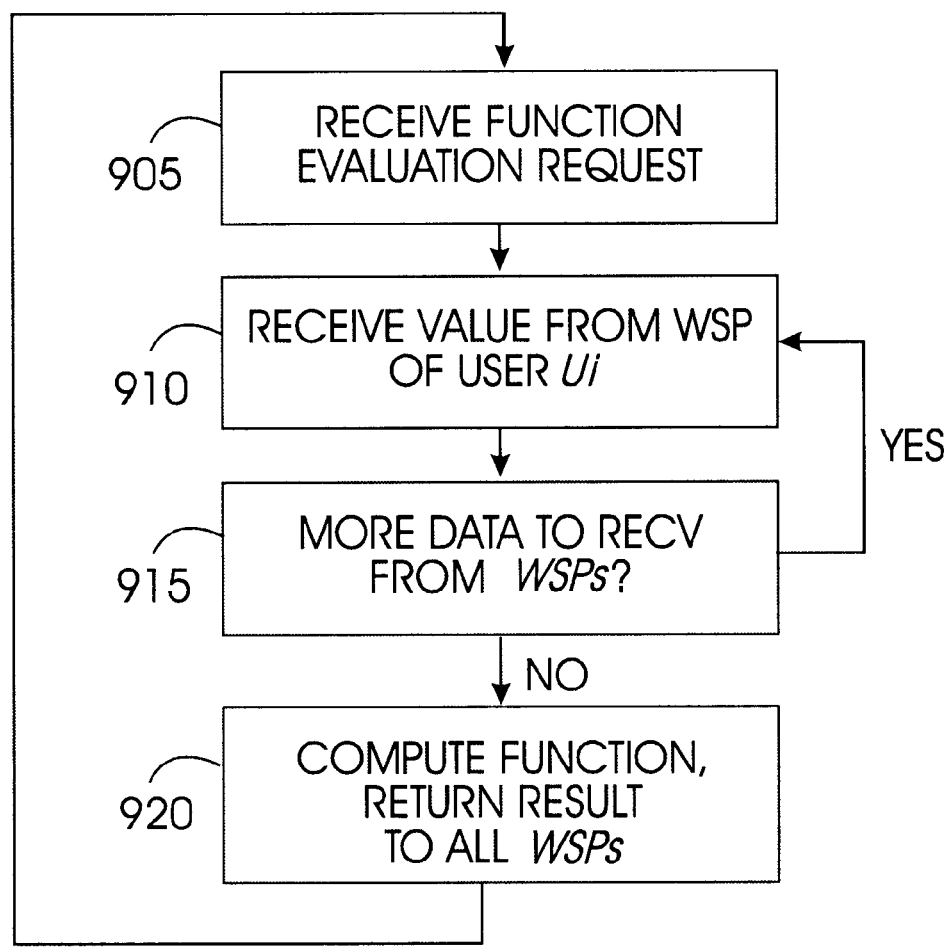
FIG. 9 illustrates a flow diagram outlining the functionality of the AFES.

FIGS. 7-9 collectively illustrate the methods associated with each of the entities in the architecture of FIG. 3. FIG. 7 illustrates a flowchart 700 outlining the process associated with the location receiver. In step 705, a location update is received from user A. Next, in step 710, an evaluation is made if user A has moved. If user A has not moved, then step 705 is repeated. On the other hand, if user A has moved, in step 715 a range request is sent to the wireless service provider (WSP) of user B. In step 725, AFES is notified to expect data; in step 730, coordinate $x_n$ is sent to AFES. In step 735, a result equal to the difference squared is received. In step 740, an evaluation is made if there are more coordinates are to be sent and, if so, steps 725 through 740 are repeated for each coordinate. On the other hand, if no more coordinates are to be sent, the distance calculation is performed to detect the proximity to user B. Lastly, after the proximity calculation in step 745 is completed, steps 705 through 745 can be repeated to dynamically update proximity information.

FIG. 8 illustrates a flow diagram 800 of the request handler process. In step 805, a range request is received from wireless service provider (WSP) of user A; and in step 810, a notification is sent to AFES to expect data. In step 815, coordinate $x_n$ is sent to AFES; in step 820, the distance-squared parameter is received. In step 825, an evaluation is made if more coordinates are to be sent and, if so, steps 810 through 825 are repeated. On the other hand, if there are no more coordinates to send, a proximity calculation is initiated to detect the proximity to user A. After the proximity calculation in step 830, steps 805 through 830 are repeated to dynamically update proximity information.

FIG. 9 illustrates a flow diagram 900 outlining the functionality of the AFES. In step 905, the AFES receives a function evaluation request; in step 910, values from the wireless service provider of user $U_i$ are received. Next, in step 915, an evaluation is made if more data is to be received from wireless service providers. If so, steps 910 through 915 are repeated. On the other hand, if there is no more data to be received, a function is computed and returned to all appropriate wireless service providers.

Figure 10:
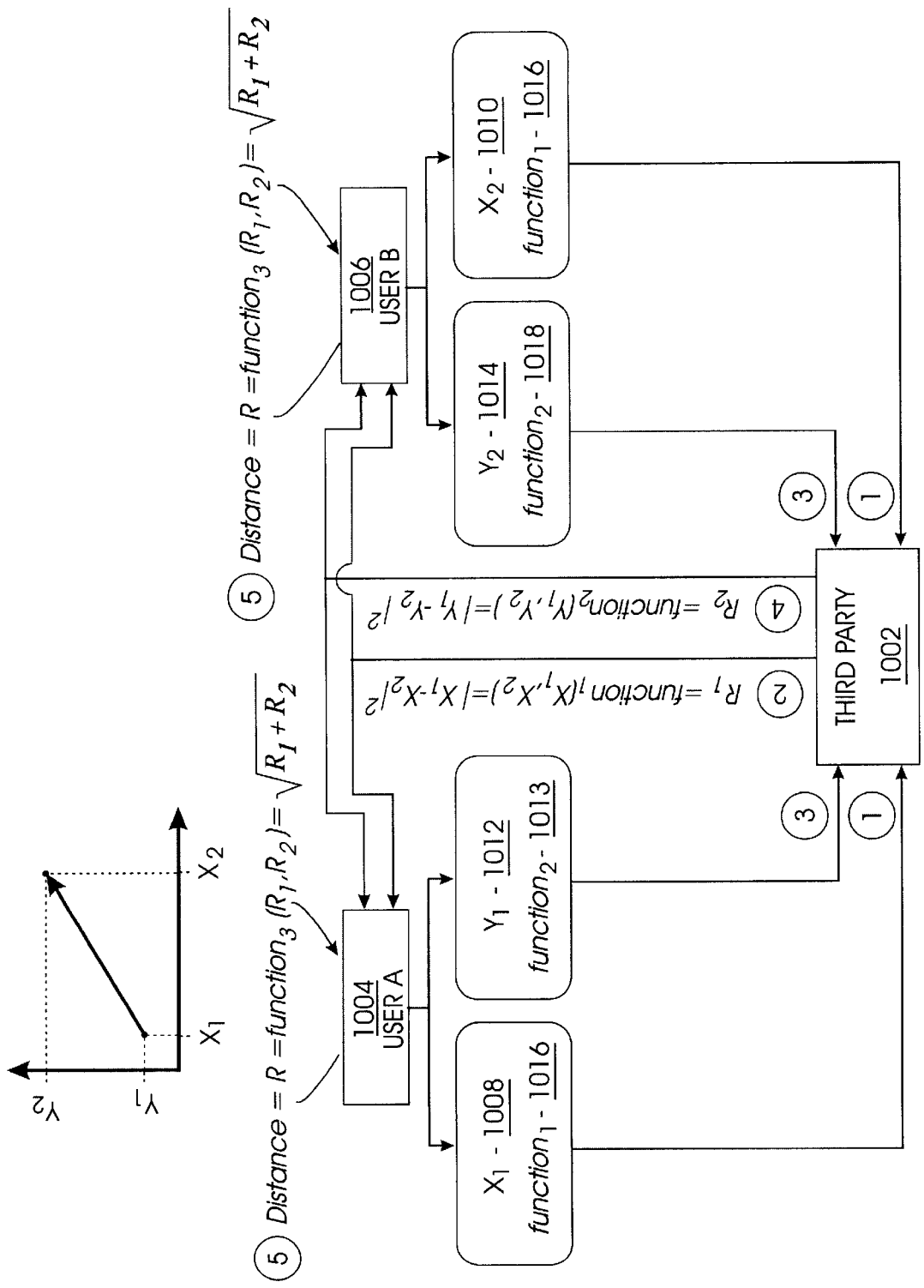
FIG. 10 summarizes a flow diagram outlining the various interactions between a third party (AFES) and users A and B for the specific example of calculating proximity based upon a calculation of the Euclidean distance between A and B.

FIG. 10 summarizes a flow diagram outlining the various interactions between a third party (AFES) 1002 and users A 1004 and B 1006 for the specific example of calculating proximity based on a calculation of the Euclidean distance between A and B. In this specific example, the x coordinates ($x_1$ 1008 and $x_2$ 1010) and the y coordinates ($y_1$ 1012 and $y_2$ 1014) are independently sent to the third party 1002, along with corresponding function(s) (function$_1$ 1016 and function$_2$ 1018). In this example, given $x_1$ and $x_2$, function$_1$ is calculated based upon $R_1=\text{function}_1(x_1, x_2)=|x_1-x_2|^2$. Similarly, given $y_1$ and $y_2$, function$_1$ is calculated based upon $R_2=\text{function}_2(y_1, y_2)=|y_1-y_2|^2$. The results, $R_1$ and $R_2$, are calculated based upon the identified evaluation functions and forwarded separately to each of the users (A 1004 and B 1006). Each user is then able to compute the proximity locally.

It should be noted that the anonymous function evaluation can be accomplished with significantly less communication and confirmation overhead. The two services would periodically exchange lists of users (IDs) for whom they wish to estimate proximity. The AFS would be told to expect a collection of floating point numbers from each service and would compute the requested function evaluation on each of these collections (returning a collection of answers). The randomization of x, y, and z coordinates for users within these collections would also be determined in one communication step between the wireless providers.

As an example, cell phones of users A and B can be equipped with an embedded java virtual machine such that arbitrary code can be executed locally to compute proximity. It should, however, be noted that mobile devices can be equipped with means for implementing code in other higher-level languages, such as C, C++, and the type of language used should not be used to limit the present invention. In the specific example of FIG. 10, given $R_1$ and $R_1$, users A and B are able to locally calculate the Euclidean distance based upon: Distance=$R=(R_1+R_2)^{1/2}$. This result is locally compared against a pre-determined threshold, t, and if estimated value, R, is within the threshold, t, an alert is issued to A or B.

Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for assisting a first and second tracking service in anonymizing preference data associated with a first and second user in a phase space (wherein the first and second tracking service track the location of the first and second user respectively and the preference data is defined by one or more parameters). The software modules: (1) aid in the reception of a request for function evaluation from each tracking service, wherein the request identifies a parameter to be transmitted and a corresponding function to be used for evaluating the identified parameter; (2) aid in the transmission of a confirmation to each tracking service indicating that the AFES is awaiting reception of the identified parameter; (3) aid in the reception of the identified parameter from each tracking service; (4) evaluate the corresponding function based on the received parameter from each tracking service; and (5) aid in the transmission of the evaluated result to each tracking service.

CONCLUSION

A system and method has been shown in the above embodiments for the effective implementation of a system and method to anonymously test for proximity of mobile users without revealing individual phase space coordinates. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by number or coordinates/functions transmitted to the AFES, type of function, type of local computation, means for implementing computation, software/program, computing environment, or specific computing hardware.

What is claimed is:

1. A method for assisting a first and second tracking service in anonymizing preference data associated with a first and second user in a phase space, said first and second tracking service tracking preferences of said first and second user respectively, said preference data being defined by one or more parameters, said method comprising the steps of:
   a. receiving a request for function evaluation from each tracking service, said request identifying a parameter to be transmitted and a corresponding function to be used for evaluating said identified parameter;
   b. transmitting a confirmation to each tracking service indicating transmission of said identified parameter is expected;
   c. receiving said identified parameter from each tracking service;
   d. evaluating said corresponding function based on said received parameter from each tracking service;
   e. transmitting said evaluated result to each tracking service; and
   wherein steps a through e are repeated for each additional parameter required to define preference data and corresponding function such that each of said service's receives function evaluated results for each parameter separately and utilizes such evaluated results to locally estimate proximity between said first and second user in said phase space without revealing their preference data.

2. A method as per claim 1, wherein communications with said tracking service is done via the hypertext transfer protocol (HTTP).

3. A method as per claim 1, wherein said parameters are Euclidean coordinates.

4. A method as per claim 1, wherein said parameters are scalar measures of said preference data.

5. A method as per claim 1, wherein said parameters are vector measures of said preference data.

6. An article of manufacture comprising a computer usable medium having computer readable program code embodied therein for assisting a first and second tracking service in anonymizing preference data associated with a first and second user in a phase space, said first and second tracking service tracking preferences of said first and second user respectively, said preference data being defined by one or more parameters, said method comprising the steps of:
   a. computer readable program code aiding in receiving a request for function evaluation from each tracking service, said request identifying a parameter to be transmitted and a corresponding function to be used for evaluating said identified parameter;
   b. computer readable program code aiding in transmitting a confirmation to each tracking service indicating transmission of said identified parameter is expected;
   c. computer readable program code aiding in receiving said identified parameter from each tracking service;
   d. computer readable program code evaluating said corresponding function based on said received parameter from each tracking service;
   e. computer readable program code aiding in transmitting said evaluated result to each tracking service; and
   wherein computer readable program code of steps a through e are repeated for each additional parameter required to define preference data and corresponding function such that each of said service's receives function evaluated results for each parameter separately and utilizes such evaluated results to locally estimate proximity between said first and second user in said phase space without revealing their preference data.

7. A method for anonymous proximity detection between a first and second mobile user, said first and second mobile users being tracked by a first and second location tracking service (LTS) respectively, said method as implemented by each LTS comprising the steps of:
   a. transmitting, to a third party, a first location coordinate along with a corresponding first function to evaluate;
   b. receiving a first result from said third party, said first result based upon an evaluation of said first function with said first location coordinate;
   c. transmitting, to said third party, a second location coordinate along with a second corresponding function to evaluate;
   d. receiving a second result from said third party, said second result based upon an evaluation of second function with said second location coordinate; and
   e. computing a measure of distance based upon said received first and second results, said computed distance providing each user with an indication of proximity with respect to the other user.

8. A method as per claim 7, wherein said third party is a non-trusted third party.

9. A method as per claim 7, wherein communications between said users and said LTS is using the hypertext transfer protocol (HTTP).

10. A method as per claim 7, wherein said computed distance is measured against a threshold to determine said indication of proximity.

11. A method as per claim 7, wherein said step of computing distance is implemented locally in a mobile device associated with said mobile users.

12. A method as per claim 11, wherein said distance is computed using a java Virtual Machine embedded in said mobile device.

13. An anonymous function evaluation service (AFES) comprising:
   a. an interface communicating with various tracking services or wireless service providers (WSPs) and receiving parameters and corresponding functions, said parameters associated with one or more users;

b. a task list storing said functions to be evaluated on received data;

c. a data cache storing said received parameters to be processed;

d. a function evaluation engine evaluating mathematical function(s) on parameters; and e. a task manager operatively linked with said task list, data cache, and function evaluation engine, said task manager: (i) receiving parameters and corresponding functions from said interface; (ii) sending said functions and parameters to task list and data cache respectively; (iii) retrieving said functions from data cache; and (iv) communicating with function evaluation engine and sending results of said function evaluation engine back to said interface for forwarding values to requesting services.

14. An anonymous function evaluation service as per claim 13, wherein said parameters are Euclidian coordinates.

15. An anonymous function evaluation service as per claim 14, wherein said Euclidean coordinates are in a floating point format.

16. An anonymous function evaluation service as per claim 13, wherein said parameters are scalar measures of preferences associated with users.

17. An anonymous function evaluation service as per claim 13, wherein said parameters are vector measures of preferences associated with users.

18. An anonymous function evaluation service as per claim 13, wherein said interface communicates via the hypertext transfer protocol (HTTP).

19. An anonymous function evaluation service as per claim 13, wherein said AFES is a non-trusted third party.

20. An anonymous function evaluation service as per claim 13, wherein said task manager performs validity checks on said parameters, evaluation functions, and any identifying keys.

* * * * *